(12) United States Patent
Hansson et al.

(10) Patent No.: US 10,118,583 B2
(45) Date of Patent: Nov. 6, 2018

(54) GAS GENERATOR

(71) Applicant: AUTOLIV DEVELOPMENT AB, Vårgårda (SE)

(72) Inventors: Mikael Hansson, Alingsas (SE); Soren Svensson, Alingsas (SE); Tobias Wangroth, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/264,762

(22) Filed: Sep. 14, 2016

(65) Prior Publication Data

US 2017/0072901 A1 Mar. 16, 2017

(30) Foreign Application Priority Data

Sep. 15, 2015 (FR) ..................................... 15 58632

(51) Int. Cl.
| | |
|---|---|
| *B60R 21/264* | (2006.01) |
| *B25B 27/14* | (2006.01) |
| *B21D 39/04* | (2006.01) |
| *F42B 3/04* | (2006.01) |
| *F42B 3/195* | (2006.01) |
| *B60R 21/26* | (2011.01) |
| *B60R 21/268* | (2011.01) |

(52) U.S. Cl.
CPC .......... *B60R 21/264* (2013.01); *B21D 39/048* (2013.01); *B25B 27/146* (2013.01); *F42B 3/045* (2013.01); *F42B 3/195* (2013.01); *B60R 2021/26035* (2013.01); *B60R 2021/2685* (2013.01)

(58) Field of Classification Search
CPC ...................... B60R 2021/2642; B60R 21/264
See application file for complete search history.

(56) References Cited

U.S. PATENT DOCUMENTS

| | | | | |
|---|---|---|---|---|
| 5,794,973 | A * | 8/1998 | O'Loughlin .......... | B60R 21/272 102/531 |
| 6,447,007 | B1 * | 9/2002 | DiGiacomo ........ | B60R 21/2644 280/736 |
| 7,290,797 | B2 * | 11/2007 | Lang ..................... | B60R 21/272 280/737 |
| 8,469,398 | B2 * | 6/2013 | Numoto ................ | B60R 21/263 102/530 |
| 2003/0062713 | A1 * | 4/2003 | Young .................. | B60R 21/2644 280/736 |
| 2011/0221173 | A1 | 9/2011 | Cox et al. | |
| 2016/0169640 | A1 * | 6/2016 | Schwuchow ........... | B60R 21/26 102/530 |

* cited by examiner

*Primary Examiner* — Reginald Tillman, Jr.
(74) *Attorney, Agent, or Firm* — Stephen T. Olson; Harness, Dickey & Pierce, P.L.C.

(57) ABSTRACT

A gas generator includes at least two functional subassemblies and at least two retention parts. The functional subassemblies each have an axis defining an axial direction and at least one outer dimension in a plane normal to the axial direction. The retention parts are each radially crimped for retaining one of the at least two functional subassemblies on the gas generator. The at least two retention parts are formed on the same part of the gas generator and the at least two functional subassemblies are positioned on the gas generator with a center distance of axes less than or equal to 1.5 times this outer dimension and that each retention part is radially crimped over at least 90% of its periphery.

10 Claims, 1 Drawing Sheet

GAS GENERATOR

FIELD

The present invention relates in a general manner to a gas generator intended to activate an automobile safety device such as an airbag, for example. In particular, the invention relates to a gas generator which comprises two ignition subassemblies which are crimped onto the gas generator.

BACKGROUND

Gas generators with ignition subassemblies mounted side by side such as is disclosed by the document US 2011/0221173 A1 are known in the prior art. They show two pyrotechnical igniters mounted and crimped axially on the gas generator. On the other hand, this system, and in particular the axial crimping have in particular the disadvantage of not being adapted to rather large ignition subassemblies, which has the result that such large subassemblies must be welded, for example, but this requires complex and expensive manufacturing equipment. Furthermore, this type of crimping is not adapted to assemblies on thin parts incapable of resisting the axial crimping stresses, which renders the construction of the generator complex.

SUMMARY

One goal of the present invention is to respond to the disadvantages of the prior art cited above and in particular to at first propose a gas generator whose dimensions are compact with in particular two functional subassemblies mounted in an inadequate environment and whose assembly is carried out in a simple and robust manner.

To this end a first aspect of the invention relates to a gas generator comprising:
  at least two functional subassemblies, each with an axis,
  at least two housings, each designed to receive one of these at least two functional subassemblies,
  at least two retention parts, each one crimped radially for retaining one of these at least two functional subassemblies on the gas generator,
wherein each of these at least two housings comprises a section transversal to the axis of the functional subassembly received with a characteristic dimension such as an inside diameter, characterized in that these at least two functional subassemblies are positioned on the gas generator with a centre distance of axes lower than or equal to 4 times one half of the sum of the characteristic dimensions and that each retention part is crimped radially on at least 90% of its periphery. Such a gas generator with the functional subassemblies spaced at a distance lower than or equal to 4 times one half of the sum of the inside dimensions of each housing (typically their inside diameter) is compact but nevertheless robust since the retention parts are crimped radially on at least 90% of their periphery. In other words, the centre distance of axes of the subassemblies is lower than or equal to 2 times the sum of the diameters of each housing. The term radial crimping denotes a permanent plastic deformation of the metallic retention parts in such a manner that the deformed part forms an anchorage or retention foot in a recess or a hollow part (for example, a crimping groove) of the functional subassemblies.

According to an embodiment, each housing of each subassembly has a diameter identical to that of the other housing.

In a preferential manner the centre distance of axes is less than or equal to 2 times one half of the sum of the characteristic dimensions, and in an even more preferential manner the centre distance of axes is less than or equal to 1.5 times one half of the sum of the characteristic dimensions.

For example, if each housing has a nominal diameter of 16 mm, then the centre distance of axes of the housings is less than or equal to 4 times one half of the sum, that is, less than or equal to 64 mm. In a preferential manner the centre distance of axes is less than or equal to 2 times one half of the sum, that is, less than or equal to 32 mm. In an even more preferential manner the centre distance of axes is less than or equal to 1.5 times one half of the sum, that is, less than or equal to 24 mm. The centre distance of axes can be fixed at 20 mm, for example.

These at least two retention parts are advantageously formed on the same part of the gas generator.

The retention parts are advantageously crimped on 100% off their periphery. According to this embodiment an irreversible plastic deformation is imposed during the course of the radial crimping over the entire periphery of the retention parts, even if this plastic deformation is not identical over the entire circumference. Typically, there can be more or less deformed zones along the circumference but there are not many compared to the initial geometry before crimping.

Such a crimping is called radial because the retention parts are deformed by a tool with crimping jaws which move in a direction contained in the plane normal to the axial direction of the functional subassemblies. Such a crimping is different from an axial crimping where the tool moves in the axial direction of the subassembly or component to be crimped. An operation of radial crimping is capable of deforming a part of the material inside of a groove, whereas an operation of axial crimping can only deform a part of material on a shoulder or on a bevel for receiving it.

The axes of each of these at least two functional subassemblies are advantageously coplanar.

The axes of each of these at least two functional subassemblies are advantageously parallel.

The functional subassemblies are advantageously ignition subassemblies, each of which comprises, for example, a pyrotechnical igniter.

The retention parts are advantageously each formed by a collar and each of the functional subassemblies comprises a groove at the level of which each collar is radially clamped.

The retention parts advantageously comprise a radially crimped zone, which crimped zones are contained in the same plane. In other words, the crimpings are performed in the same plane or at the same height.

Each of the collars advantageously defines at least one bore part designed to receive these at least two functional subassemblies.

A second aspect of the invention relates to a safety module comprising at least one gas generator according to the first aspect of the invention.

A third aspect of the invention relates to an automobile comprising at least one safety module according to the second aspect of the invention.

A fourth aspect of the invention relates to a crimping tool radially designed to radially crimp at least two functional subassemblies of a gas generator according to the first aspect of the invention, wherein the crimping tool comprises a plurality of jaws, characterized in that the tool is designed to crimp in a single crimping operation at least 90% of the periphery of each retention part.

In a general manner, the crimping tool is designed to radially crimp at least two functional subassemblies, each with an axis defining an axial direction and designed in a housing with a transversal section with a characteristic dimension on at least two retention parts, each crimped radially by this crimping tool in order to retain each one of these at least two functional subassemblies on the gas generator, characterized in that these at least two functional subassemblies are positioned on the gas generator with a centre distance of axes less than or equal to 4 times one half the sum of the characteristic dimensions, and that each retention part is crimped radially on at least 90% of its periphery. In other words, the crimping tool according to the invention is designed to radially and simultaneously crimp these at least two functional subassemblies while having a centre distance of axes less than or equal to 4 times one half the sum of the characteristic dimensions of their housing (their inside diameter, for example, if they are subassemblies with a shape/symmetry of revolution which are received in the housings).

It is advantageous if at least one jaw comprises a crimping impression part of each of these at least two retention parts. Therefore, the tool comprises at least one jaw which carries an impression part for crimping each of the retention parts. In other words, a tool part allows the crimping of a part of each of the retention parts, and this part is found at least in part during the course of the crimping between the retention parts, which allows them to be crimped simultaneously and over a large part of their periphery. Furthermore, this allows the distance between the two subassemblies to be further reduced.

This at least one jaw advantageously comprises an impression part for crimping each of these at least two retention parts and is designed to move in the plane normal to the axial direction of the functional subassemblies along a direction normal to a straight line passing through the axes of each of the functional subassemblies during the crimping operation. In other words, the at least one jaw moves along a direction which is normal to a straight line contained in the plane normal to the axial direction of the functional subassemblies and which passes through the intersection of the axes of each of the functional subassemblies with this plane normal to the axial direction of the functional subassemblies.

This at least one jaw advantageously comprises a crimping impression part for each of these at least two retention parts, comprising in the plane normal to the axial direction of the functional subassemblies at least one axis of symmetry which passes between the axes of each of the functional subassemblies. Such an implementation allows the stresses and deformations of crimping to be balanced in order to obtain crimped retention parts which respond to the same criteria of deformation and of resistance to rupture.

Each of the jaws is advantageously designed to move during the course of the crimping operation along a direction comprised in the plane normal to the axial direction of the functional subassemblies.

The direction of movement of at least one part of the jaws advantageously does not pass through one of the axes of each of the functional subassemblies.

Each of the jaws advantageously comprises a crimping impression designed to radially crimp a part of a retention part.

The crimping impressions are advantageously arranged in the same plane, at about ±5 millimeters.

The direction of movement of each of the jaws advantageously passes through an axis arranged between the axes of each of these at least two functional subassemblies, and preferably arranged at the same distance from the axes of each of these at least two functional subassemblies.

Other characteristics and advantages of the present invention will appear more clearly from a reading of the detailed following description of an embodiment of the invention given by way of non-limiting example and illustrated by the attached drawings in which.

Figure 1:
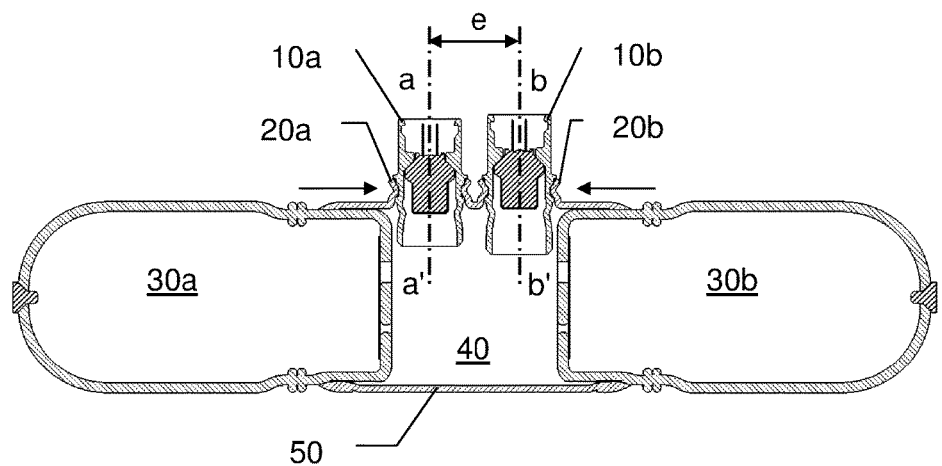
FIG. 1 shows a section of a gas generator according to the invention comprising two ignition subassemblies.

FIG. 1 shows a section of a gas generator comprising two ignition subassemblies 10a and 10b, each mounted in a housing of the gas diffuser and crimped on a gas diffuser 50 and each comprising an axis (aa') and (bb') respectively.

DETAILED DESCRIPTION

The gas generator comprises two gas reserves 30a and 30b arranged on each side of the gas diffuser 50. It is possible to envisage keeping these components together by welding, for example. The gas diffuser 50 defines a diffusion chamber 40 which is designed to receive inflation gases from the part of the two gas reserves 30a and 30b and then defuse these gases toward a safety member such as an airbag, for example, in order to ensure the safety of the occupants of an automobile. For example, the gas reserves 30a and 30b can contain pressurized gas and it is possible to envision storing different gases in each gas reserve 30a and 30b in such a manner as to make them react once they are discharged.

The two ignition subassemblies 10a and 10b typically control the functioning of the gas generator by bringing about the opening of the gas reserves 30a and 30b with the aid of a mechanism housed in the diffusion chamber 40 and which is not shown in order to simplify FIG. 1. For example, each of the two ignition subassemblies 10a and 10b can comprise a pyrotechnical igniter provided with two connection pins which can be released with an electrical impulse generated by a deceleration sensor when it detects conditions indicative of a vehicle accident. The connection pins are substantially parallel to the axes (aa') and (bb') of their respective subassembly.

The gas diffuser 50 comprises two collars 20a and 20b, each of which receives one of the two ignition subassemblies 10a and 10b respectively. Each collar 20a and 20b is radially crimped for retaining the two ignition subassemblies 10a and 10b on the gas generator and is adjacent to the housing (a bore here) which receives the ignition subassembly 10a or 10b.

The arrows at the level of the crimping of the collars 20a and 20b represent the direction of movement of the material of the collars 20a and 20b which was pushed back by a tool in the groove of each of the two ignition subassemblies 10a and 10b. A crimping with such a direction of movement of the tool (typically a plurality of jaws) is called radial crimping because if the axis (aa') or (bb') is taken as reference the direction of the movement of the crimping jaws is comprised in a plane normal to the axes (aa') and (bb').

As FIG. 1 shows, the ignition subassemblies 10a and 10b are close to one another. In particular, their centre distance of axes (e) is less than or equal to 1.5 times the diameter of their housing. For example, each housing of the gas diffuser 50 has a diameter of 15.8 millimeters and the centre distance of axes of the ignition subassemblies 10a and 10b is 20 millimeters, which is approximately 1.27 times one half of the sum of the diameters of the two housings. However, the invention proposes in such a geometrical context crimping the two ignition subassemblies 10a and 10b radially and over the entire periphery (at least 90%) of the two collars 20a and 20b.

Figure 2:
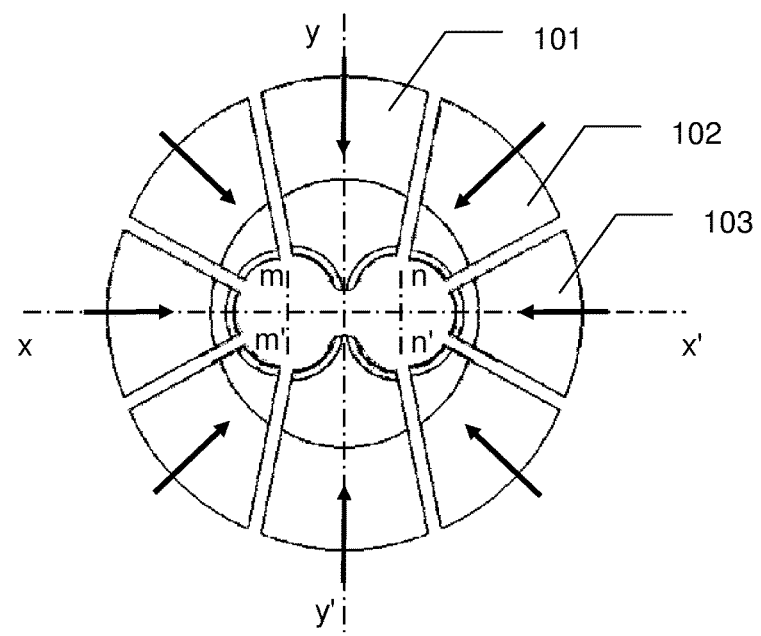
FIG. 2 shows a radial crimping tool designed to perform a simultaneous radial crimping on each of the ignition subassemblies of the gas generator of FIG. 1.

To this end the invention proposes using a radial crimping tool shown in FIG. 2. Such a tool is composed by a plurality of crimping jaws 101, 102, 103, ... intended to be mounted on a hydraulic crimping machine, for example.

FIG. 2 is a view of the tool in a plane normal to the axes (aa') and (bb') and the crimping tool has a circular outer shape having as its centre the intersection of an axis (xx') and an axis (yy') which form a reference point in this plane normal to the axes (aa') and (bb'). The axes (aa') and (bb') are localized at the intersections of the axis (xx') respectively with an axis (mm') and an axis (nn').

The crimping tool comprises two axes of symmetry: the axis (xx') and the axis (yy'), so the not-shown crimping jaws are each symmetrical with one of the shown jaws 101, 202 or 103. Finally, the axes (mm') and (nn') are symmetrical relative to the axis (yy'), which means that the axes (aa') and (bb') are equidistant relative to the axis (yy'), or also symmetrical relative to a plane normal to the FIG. 2 and passing through the axis (yy').

Each of the jaws 101, 102, 103 is mobile relative to the other ones and can be moved along a direction of movement which is represented by an arrow on each jaw 101, 102, 103, .... It should be noted that each of the directions of movement of the jaws passes through the intersection of the axes (xx') and (yy') and that some of the jaws (the jaws 101, 102 and the elements symmetrical to them in particular) have directions of movement which do not pass through the axes (aa') and (bb') of the two ignition subassemblies 10a and 10b respectively.

FIG. 2 is a top view onto the crimping tool, but it should be noted that according to a preferred embodiment the crimping impressions, which are the peripheral zones of each jaw which will crimp the retention parts of the gas generator, are all situated in the same plane, parallel to the plane of FIG. 2.

Finally, the jaw 101 and the element symmetrical to it relative to the axis (xx') both have a plane of symmetry which is the plane normal to the FIG. 2 in which contains the axis (yy'). It is important to also note that these two jaws each comprise an impression for crimping each retention part, the collars 20a and 20b. In other words, each of these two jaws is arranged to crimp a part of each collar 20a and 20b. To this end each jaw comprises a point which engages between the collars 20a and 20b during the crimping in order to deform them even in the zone which is difficult to access between the collars 20a and 20b.

It should also be noted that there is in FIG. 2 a space between each jaw 101, 102, 103, ... and it should be noted that this space will be reduced during the crimping but without the jaws necessarily touching each other at the end of the crimping course. However, even the material zone facing the inter-jaw space at the end of the crimping is forced to plastically deform, in particular on account of the difference of diameter between the groove bottom at the end of crimping and the initial diameter of the collars 20a and 20b.

It is understood that various modifications and/or improvements evident to a person skilled in the art can be added to the different embodiments of the invention described in the present description without departing from the scope of the invention defined by the attached claims.

The invention claimed is:

1. A gas generator comprising:
   at least two functional subassemblies, including at least a first functional subassembly extending along a first central axis and a second functional subassembly extending along a second central axis, the first and second functional subassemblies both extending along a respective one of the first and second central axes between a first end having a pyrotechnical igniter and an open second end;
   at least two housings, each housing designed to receive a corresponding one of the at least two functional subassemblies;
   at least two retention parts, each retention part crimped radially for retaining a corresponding one of the at least two functional subassemblies on the gas generator,
   wherein each of the at least two housings comprises a section transversal to the axis of the functional subassembly received with a characteristic dimension,
   wherein the first and second functional subassemblies are positioned on the gas generator with a distance between the first and second axes lower than or equal to 4 times one half of a sum of the characteristic dimensions and that each retention part is crimped radially on at least 90% of its periphery;
   wherein the first and second central axes of the at least two functional subassemblies, respectively, are spaced apart from one another, and
   wherein the retention parts are each formed by a collar and in which each of the functional subassemblies comprises a groove at a level of which each collar is radially clamped.

2. The gas generator according to the claim 1, wherein the first and second central axes of the first and second functional subassemblies are in a common plane.

3. The gas generator according to claim 1, wherein the first and second axes of the first and second functional subassemblies are parallel.

4. The gas generator according to claim 1, wherein the first and second functional subassemblies are ignition subassemblies.

5. The gas generator according to claim 1, wherein the retention parts each comprise a radially crimped zone circumferentially extending around a respective one of the retention parts, which radially crimped zones are in a common plane.

6. The gas generator according to claim 1, in combination with a safety module.

7. A gas generator comprising:
   at least two functional subassemblies, including at least a first functional subassembly extending along a first central axis and a second functional subassembly extending along a second central axis, the first and second functional subassemblies both extending along a respective one of the first and second central axes between a first end having a pyrotechnical igniter and an open second end;
   at least two housings, each housing designed to receive a corresponding one of the at least two functional subassemblies;
   at least two retention parts, each retention part crimped radially for retaining a corresponding one of the at least two functional subassemblies on the gas generator,
   wherein each of the at least two housings comprises a section transversal to the axis of the functional subassembly received with a characteristic dimension, wherein each retention part is crimped radially on at least 90% of its periphery;

wherein the first and second central axes of the at least two functional subassemblies, respectively, are spaced apart from one another, and wherein the retention parts are each formed by a collar and in which each of the functional subassemblies comprises a groove at a level of which each collar is radially clamped.

8. The gas generator according to claim 7, wherein the first and second retention parts are both radially crimped to the corresponding one of the first and second functional subassemblies in a plane perpendicular to the first and second axes.

9. The gas generator of claim 7, in combination with a safety module.

10. The gas generator according to claim 7, wherein the at least two retention parts includes first and second retention parts both radially crimped to the corresponding one of the first and second functional subassemblies in a plane perpendicular to the first and second axes.

* * * * *